(12) United States Patent
Yamagishi

(10) Patent No.: US 10,107,336 B2
(45) Date of Patent: Oct. 23, 2018

(54) OIL SUPPLY DEVICE AND LINEAR MOTION GUIDE DEVICE

(71) Applicant: NSK Ltd., Shinagawa-ku, Tokyo (JP)

(72) Inventor: Nobuaki Yamagishi, Hanyu (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/560,250

(22) PCT Filed: Mar. 30, 2016

(86) PCT No.: PCT/JP2016/001853
§ 371 (c)(1),
(2) Date: Sep. 21, 2017

(87) PCT Pub. No.: WO2016/157904
PCT Pub. Date: Oct. 6, 2016

(65) Prior Publication Data
US 2018/0066709 A1    Mar. 8, 2018

(30) Foreign Application Priority Data
Mar. 31, 2015  (JP) ................. 2015-073440

(51) Int. Cl.
*F16C 29/06* (2006.01)
*F16C 33/10* (2006.01)
*F16C 33/66* (2006.01)

(52) U.S. Cl.
CPC ...... *F16C 33/6659* (2013.01); *F16C 29/0638* (2013.01); *F16C 33/664* (2013.01)

(58) Field of Classification Search
CPC .............. F16C 29/0635; F16C 29/0638; F16C 29/0642; F16C 29/0645; F16C 29/0647;
(Continued)

(56) References Cited

U.S. PATENT DOCUMENTS 6,401,867 B1 * 6/2002 Michioka ................ B23Q 1/58
                                                184/100
2006/0102427 A1 * 5/2006 Wu ...................... F16C 29/0609
                                                184/5
(Continued)

FOREIGN PATENT DOCUMENTS

CN      1982735 A      6/2007
CN      101245808 A    8/2008
(Continued)

OTHER PUBLICATIONS

International Search Report (PCT/ISA/210) issued in PCT Application No. PCT/JP2016/001853 dated Jul. 5, 2016 with English translation (Three (3) pages).
(Continued)

*Primary Examiner* — Phillip A Johnson
(74) *Attorney, Agent, or Firm* — Crowell & Moring LLP

(57) ABSTRACT

An oil supply device provided on a slider main body of a linear motion guide device includes: a storing member; an applicator; and a container. In the container, a storing member accommodation portion and an applicator accommodation portion are provided to be arranged in an up-down direction. A communication hole for guiding the lubricant from the storing member accommodation portion to the applicator accommodation portion is formed in the up-down direction in a partition portion which partitions the applicator accommodation portion and the storing member accommodation portion. The communication hole includes a small diameter portion which is positioned on the applicator accommodation portion side and a large diameter portion which is positioned on the storing member accommodation portion side. The storing member includes a protrusion portion capable of fitting into the large diameter portion.

7 Claims, 11 Drawing Sheets

(58) Field of Classification Search
CPC .......................... F16C 29/065; F16C 29/0652; F16C 29/0654; F16C 29/0659; F16C 29/0661; F16C 29/0664; F16C 29/0666; F16C 29/0669; F16C 29/0671; F16C 29/0673; F16C 33/6611; F16C 33/6622; F16C 33/6648; F16C 33/6659
See application file for complete search history.

(56) References Cited

U.S. PATENT DOCUMENTS

2009/0074335 A1\* 3/2009 Kuwabara ............. F16C 29/065
 384/43
2015/0071576 A1\* 3/2015 Kito .................... F16C 33/6648
 384/13

FOREIGN PATENT DOCUMENTS

| CN | 101260931 A | 9/2008 |
|---|---|---|
| DE | 10 2006 003 849 B3 | 3/2007 |
| JP | 9-303392 A | 11/1997 |
| JP | 10-196651 A | 7/1998 |
| JP | 2002-147453 A | 5/2002 |
| JP | 3288961 B2 | 6/2002 |
| JP | 4111585 B2 | 7/2008 |
| JP | 2008-286252 A | 11/2008 |
| JP | 2008-291904 A | 12/2008 |
| JP | 2013-19441 A | 1/2013 |

OTHER PUBLICATIONS

Japanese-language Written Opinion (PCT/ISA/237) issued in PCT Application No. PCT/JP2016/001853 dated Jul. 5, 2016 (Three (3) pages).
European Search Report issued in counterpart European Application No. 16771790.9 dated Mar. 2, 2018 (seven (7) pages).
International Preliminary Report on Patentability (PCT/IB/338 & PCT/IB/373) issued in PCT Application No. PCT/JP2016/001853 dated Oct. 12, 2017, including English translation of document C2 (Japanese-language Written Opinion (PCT/ISA/237)) previously filed on Sep. 21, 2017 (Six (6) pages).
Chinese-language Office Action issued in counterpart Chinese Application No. 201680017988.X dated Sep. 4, 2018 with partial English translation (12 pages).

\* cited by examiner

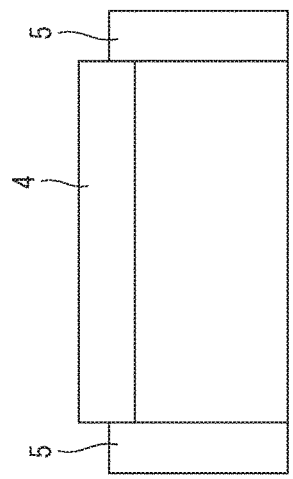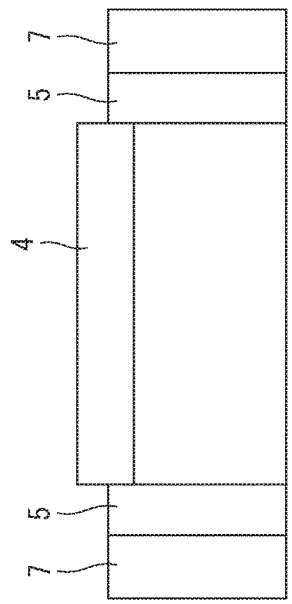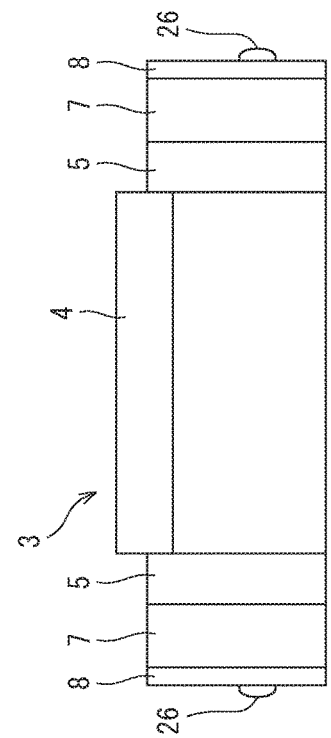
FIG.11B
FIG.11D
FIG.11F
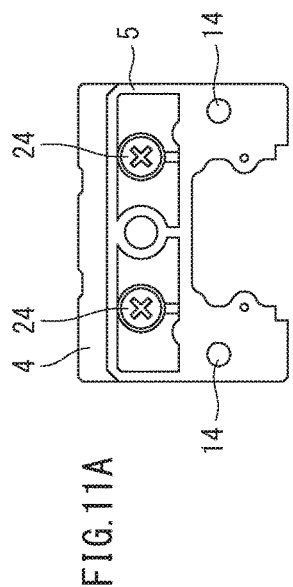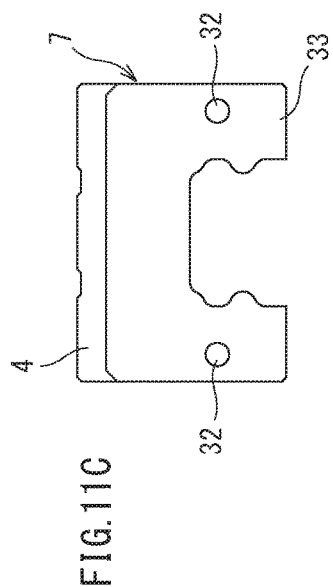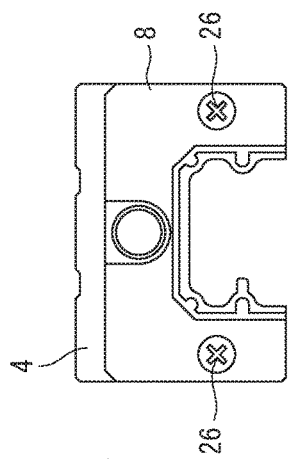
FIG.11A
FIG.11C
FIG.11E FIG. 12A
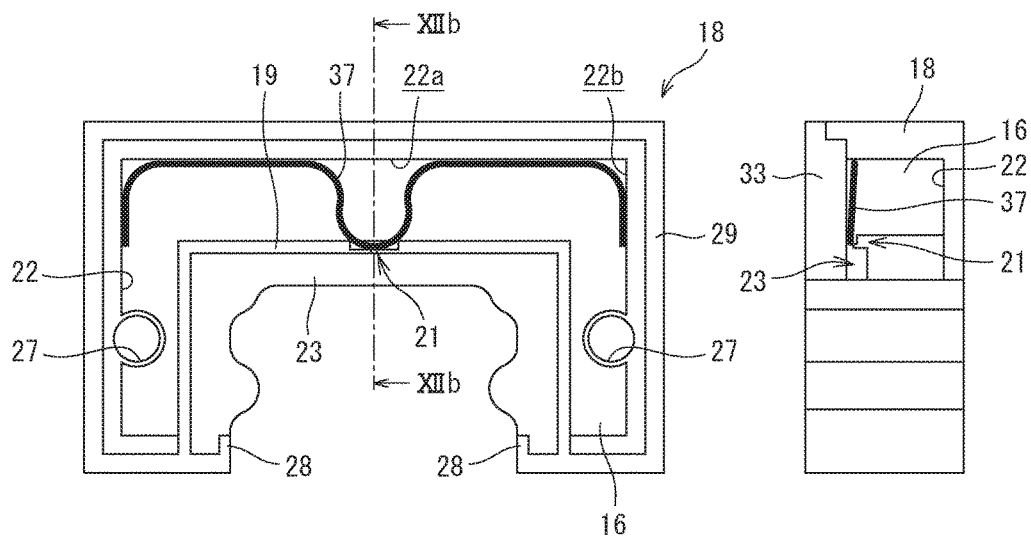
FIG. 12B
FIG. 12C
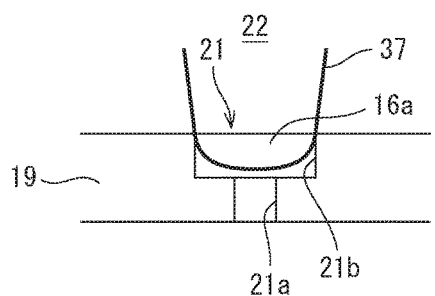
FIG. 12D
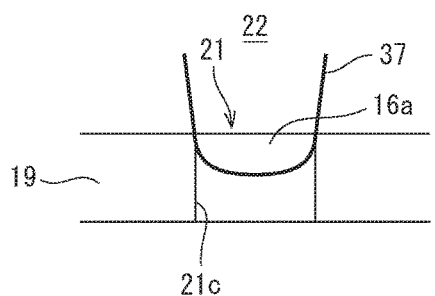

OIL SUPPLY DEVICE AND LINEAR MOTION GUIDE DEVICE

TECHNICAL FIELD

The present invention relates to an oil supply device which is used in a rolling bearing guide device such as a linear motion guide device or a curvilinear motion guide device, and to a linear motion guide device which is provided with the oil supply device.

BACKGROUND ART

In the related art, as a rolling bearing guide device, a linear motion guide device having a linearly extending guide rail and a curvilinear motion guide device having a curved guide rail are known. In particular, as a linear motion guide device, there is known a linear motion guide device which is provided with an oil supply device which supplies a lubricating oil to the guide rail.

As such an oil supply device, there is proposed an oil supply device which includes an applicator which applies the lubricating oil to the guide rail and a storing member which supplies the lubricating oil to the applicator while absorbing and storing the lubricating oil (for example, refer to PTLs 1 and 2). In such an oil supply device, a separation plate which is provided with a lubricating oil supply hole is disposed between the storing member and the applicator in order to restrict the amount of the lubricating oil which is supplied from the storing member to the applicator.

CITATION LIST

Patent Literature

PTL 1: Japanese Patent No. 3288961
PTL 2: Japanese Patent No. 4111585

SUMMARY OF INVENTION

Technical Problem

However, in the oil supply devices which are disclosed in PTLs 1 and 2, the storing member and the applicator are arranged in a longitudinal direction of the guide rail and the supply hole of the separation plate penetrates in the longitudinal direction of the guide rail. Therefore, the lubricating oil which is absorbed and stored by the storing member passes through the supply hole and spreads inside the applicator in the longitudinal direction. Therefore, since the lubricating oil does not easily spread in a direction which is perpendicular to the longitudinal direction within the applicator, the amount of the lubricating oil which reaches the portion at which the applicator contacts the guide rail is little. As a result, there is a case in which it is not possible to sufficiently apply the lubricating oil to the guide rail.

Therefore, the present invention focuses on this problem, and an object of the present invention is to provide an oil supply device and a linear motion guide device which are capable of sufficiently applying a lubricant to the guide rail.

Solution to Problem

In order to achieve the object mentioned above, according to an aspect of the present invention, there is provided an oil supply device including: a storing member which holds a lubricant; an applicator for applying the lubricant to a guide rail; and a container which accommodates the applicator and the storing member and is installed on an end portion in a longitudinal direction of a slider, wherein in the container, a storing member accommodation portion which accommodates the storing member and an applicator accommodation portion which accommodates the applicator are provided to be arranged in an up-down direction and a communication hole for guiding the lubricant from the storing member accommodation portion to the applicator accommodation portion is formed in the up-down direction in a partition portion which partitions the applicator accommodation portion and the storing member accommodation portion, wherein the communication hole includes a small diameter portion which is positioned on the applicator accommodation portion side and a large diameter portion which is positioned on the storing member accommodation portion side and is larger than the small diameter portion, and wherein the storing member is provided with a protrusion portion which is capable of fitting into the large diameter portion.

In the oil supply device, the applicator may include a porous formed body, and the storing member may include a porous formed body having a greater per-unit-volume amount of holding the lubricant than that of the applicator.

In the oil supply device, the storing member accommodation portion may be set to have a deeper bottom and a greater capacity than those of the applicator accommodation portion.

In the oil supply device, in the applicator accommodation portion, a portion facing the guide rail may be open and a support portion for supporting the applicator while positioning the applicator in the up-down direction may be provided.

The oil supply device may be include a pressing member which presses the storing member which is accommodated in the storing member accommodation portion.

In the oil supply device, the applicator and the storing member may contact each other inside the communication hole or in a vicinity of the communication hole.

In addition, in order to achieve the object mentioned above, according to another aspect of the present invention, there is provided a linear motion guide device, including: a guide rail; a slider; and rolling elements, wherein the guide rail and the slider include respective rolling surfaces in positions facing each other, the rolling surfaces forming a rolling path of the rolling elements, wherein the rolling surfaces extend in a longitudinal direction of the guide rail, wherein the rolling elements are disposed in the rolling path, wherein the slider straddles on the guide rail via the rolling elements to be capable of moving along the longitudinal direction and is provided with a slider main body and an end cap on at least one of both end surfaces of the slider main body in a movement direction, wherein an oil supply device is provided on at least one of both end surfaces of the slider in the movement direction.

The oil supply device includes: a storing member which holds a lubricant; an applicator for applying the lubricant to a guide rail; and a container which accommodates the applicator and the storing member and is installed on an end portion in a longitudinal direction of a slider. In the container, a storing member accommodation portion which accommodates the storing member and an applicator accommodation portion which accommodates the applicator are provided to be arranged in an up-down direction and a communication hole for guiding the lubricant from the storing member accommodation portion to the applicator accommodation portion is formed in the up-down direction in a partition portion which partitions the applicator accommodation portion and the storing member accommodation portion. The communication hole includes a small diameter portion which is positioned on the applicator accommodation portion side and a large diameter portion which is positioned on the storing member accommodation portion side and is larger than the small diameter portion. The storing member is provided with a protrusion portion which is capable of fitting into the large diameter portion.

In the linear motion guide device, the applicator may include a porous formed body, and the storing member may include a porous formed body having a greater per-unit-volume amount of holding the lubricant than that of the applicator.

In linear motion guide device, the storing member accommodation portion may be set to have a deeper bottom and a greater capacity than those of the applicator accommodation portion.

In the linear motion guide device, in the applicator accommodation portion, a portion facing the guide rail may be open and a support portion for supporting the applicator while positioning the applicator in the up-down direction may be provided.

The linear motion guide device may be include a pressing member which presses the storing member which is accommodated in the storing member accommodation portion.

In the linear motion guide device, the applicator and the storing member may contact each other inside the communication hole or in a vicinity of the communication hole.

Advantageous Effects of Invention

According to an aspect of the present invention, an oil supply device capable of sufficiently applying a lubricant to a guide rail and a linear motion guide device having the same are provided.

BRIEF DESCRIPTION OF DRAWINGS

FIG. 1A is a perspective view and FIG. 1B is a side view;

FIG. 2A is a side view and FIG. 2B is a front view;

FIG. 3A is a front view and FIG. 3B is a rear view;

FIG. 5A is a rear view, FIG. 5B is an enlarged sectional diagram of a communication hole portion, and FIG. 5C is an enlarged sectional diagram of a communication hole portion as a modification example;

FIG. 6A is a front view and FIG. 6B is a side view;

FIG. 7A is a front view and FIG. 7B is a side view;

FIG. 8A is a rear view, FIG. 8B is a side view, and FIG. 8C is an enlarged sectional diagram of the communication hole portion;

FIG. 9A is a front view and FIG. 9B is a side view;

FIGS. 11A to 11F are diagrams illustrating a procedure of attaching the oil supply device to the slider main body in the first embodiment of the linear motion guide device, where FIGS. 11A and 11B are a rear view and a side view of a situation in which the end cap is attached to the slider main body, FIGS. 11C and 11D are a rear view and a side view of a situation in which the oil supply device is attached to the end cap side of the slider main body to which the end cap is attached, and FIGS. 11E and 11F are a rear view and a side view of a situation in which the side seal is attached to the oil supply device side of the slider main body to which the end cap and the oil supply device are attached; and FIGS. 12A to 12D are diagrams illustrating a configuration in a second embodiment of an oil supply device, where FIG. 12A is a rear view, FIG. 12B is a sectional diagram taken along an XIIb-XIIb line of FIG. 12A, FIG. 12C is an enlarged sectional diagram of a communication hole portion, and FIG. 12D is an enlarged sectional diagram of a communication hole portion which serves as a modification example.

DESCRIPTION OF EMBODIMENTS

Hereinafter, a description will be given of embodiments of an oil supply device for a linear motion guide device (hereinafter this may be referred to as "an oil supply device") and a linear motion guide device which is provided with the oil supply device with reference to the drawings.

In the following detailed description, in order to provide a complete understanding of the embodiments of the present invention, the description will be given of specific details. However, it should be clear that it is possible to carry out one or more embodiments even when related specific details are absent. Additionally, in order to simplify the illustration, well-known structures and devices are omitted.

First Embodiment

<Linear Motion Guide Device>

Figure 1A:
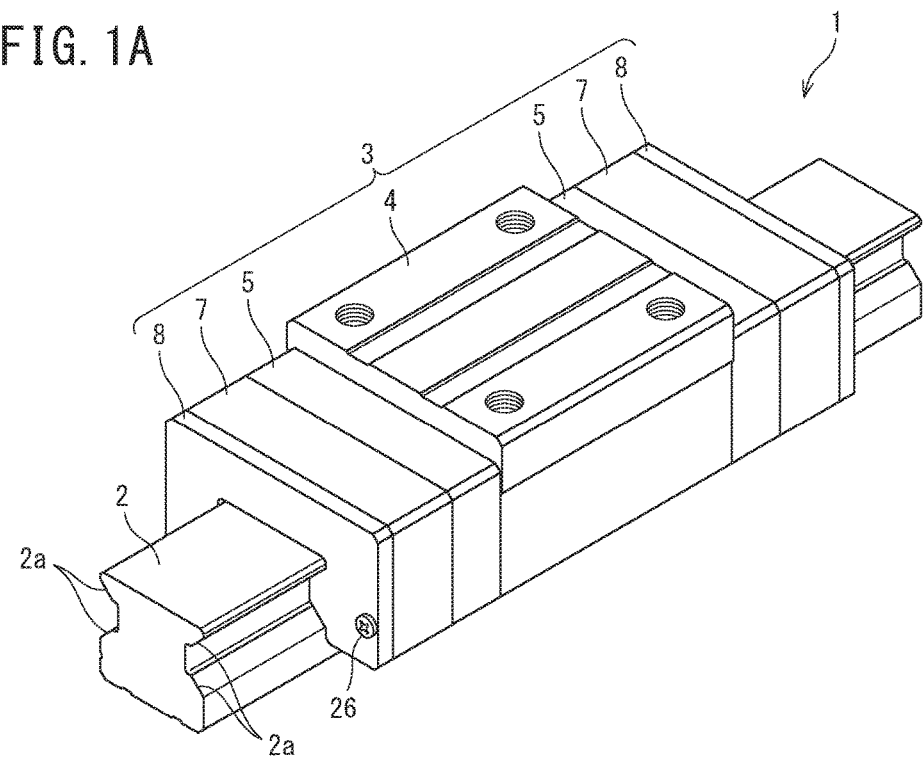
FIGS. 1A and 1B are diagrams illustrating a configuration in a first embodiment of a linear motion guide device, where
Figure 1B:
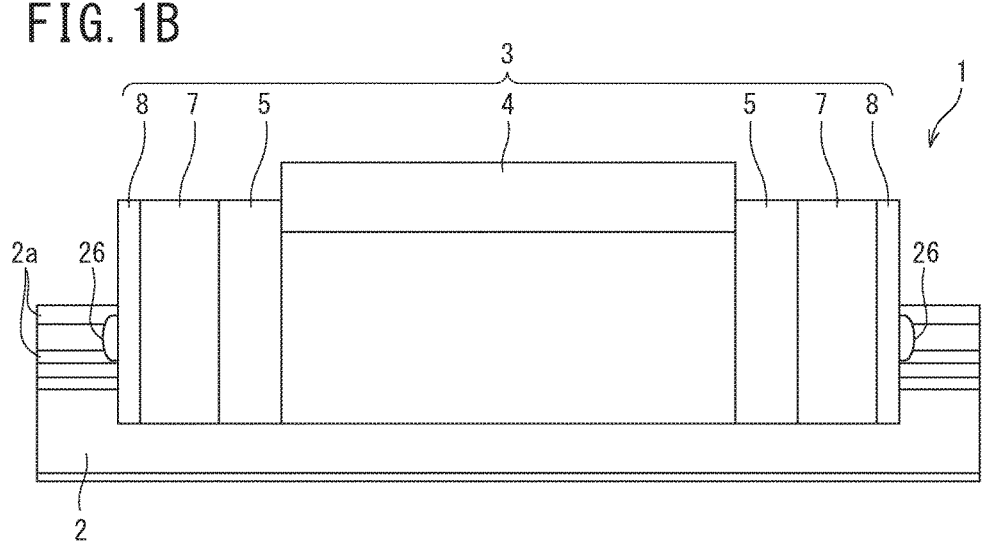

As illustrated in FIGS. 1A and 1B, a linear motion guide device (a linear guide device) 1 of the present embodiment includes a guide rail 2, rolling elements (not illustrated), and a slider 3 which is capable of moving along the longitudinal direction of the guide rail 2 through the rolling elements. The linear motion guide device 1 of the present embodiment is favorable for a numerically controlled machine tool, a numerically controlled measuring machine, or the like, for example.

The guide rail 2 includes a substantially rectangular prism shaped member which is made of metal with two rolling surfaces 2a which extend in the longitudinal direction formed on each of both side surfaces of the guide rail 2.

The slider 3 includes a slider main body 4, and attached in order from the slider main body 4 side on both end portions in the longitudinal direction (the left-right direction of FIG. 1B) of the slider main body 4, end caps 5, oil supply devices 7, and side seals 8. Hereinafter, in the present embodiment, the longitudinal direction of the guide rail 2 may be referred to as the movement direction of the slider 3 (the slider main body 4) and, of the directions which are perpendicular to the movement direction, the direction in which the slider main body straddles on the guide rail 2 using the guide rail 2 as a reference may be referred to as "the up-down direction" and the direction which joins both side surfaces of the guide rail 2 may be referred to as "the width direction". The surfaces of the end caps 5, the oil supply devices 7, and the side seals 8 on the sides facing the slider main body 4 are "the front surfaces" and the surfaces of the opposite sides are "the rear surfaces" using the movement direction as a reference.

[Slider Main Body]

Figure 2A:
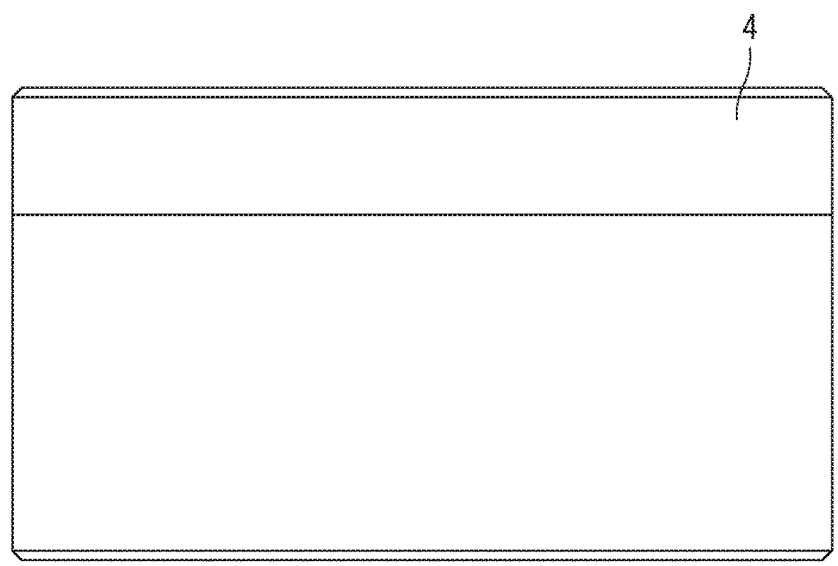
FIGS. 2A and 2B are diagrams illustrating a configuration of a slider main body in the first embodiment of the linear motion guide device, where
Figure 2B:
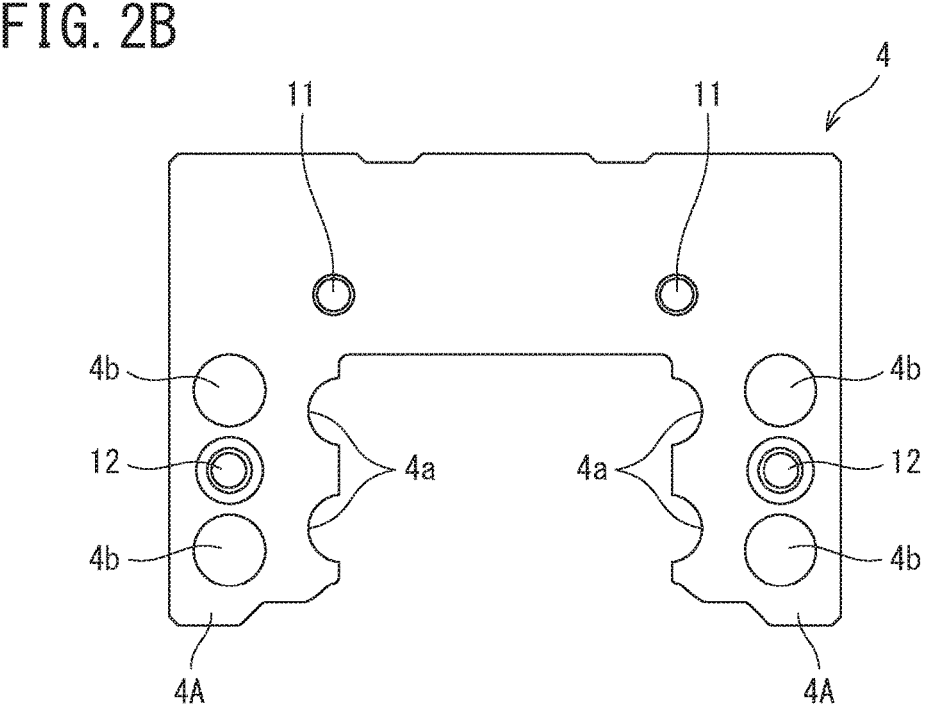

As illustrated in FIGS. 1A, 1B, 2A, and 2B the slider main body 4 extends in the longitudinal direction of the guide rail 2, includes a member with a substantially U-shaped cross section which is made of metal, and straddles on the guide rail 2. As illustrated in FIG. 2B, two rolling surfaces 4a which face the rolling surfaces 2a of the guide rail 2 and extend in the longitudinal direction are formed for each of the inside surfaces of leg portions 4A and 4A which face both side surfaces of the guide rail 2 in the slider main body 4.

The rolling surfaces 4a of the slider main body 4 and the rolling surfaces 2a of the guide rail 2 form rolling paths of the rolling elements (not illustrated). As the rolling elements, for example, a plurality of balls is loaded into the rolling path.

As illustrated in FIG. 2B, two return paths 4b which penetrate in the longitudinal direction of the slider main body 4 are formed for each of the leg portions 4A and 4A of the slider main body 4. Screw holes 11 and 12 are formed in two locations for each of both end surfaces of the slider main body 4.

[End Cap]

Figure 3A:
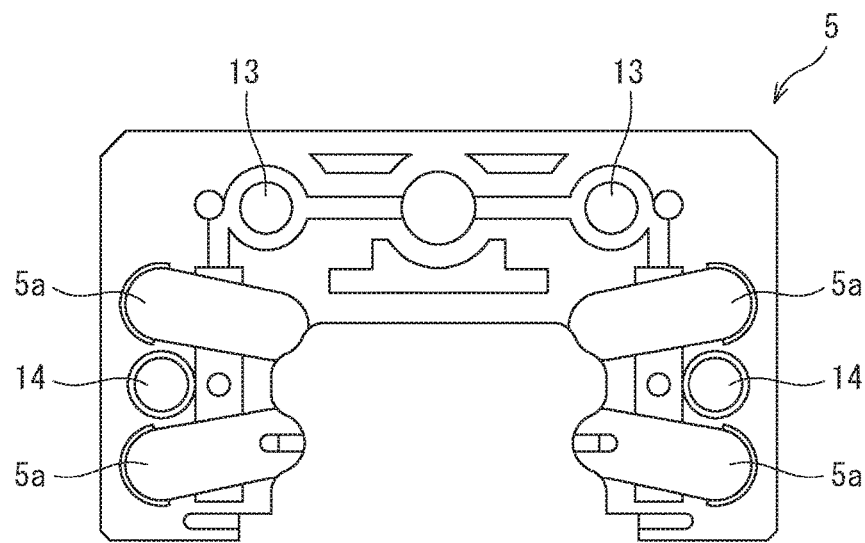
FIGS. 3A and 3B are diagrams illustrating a configuration of an end cap in the first embodiment of the linear motion guide device, where
Figure 3B:
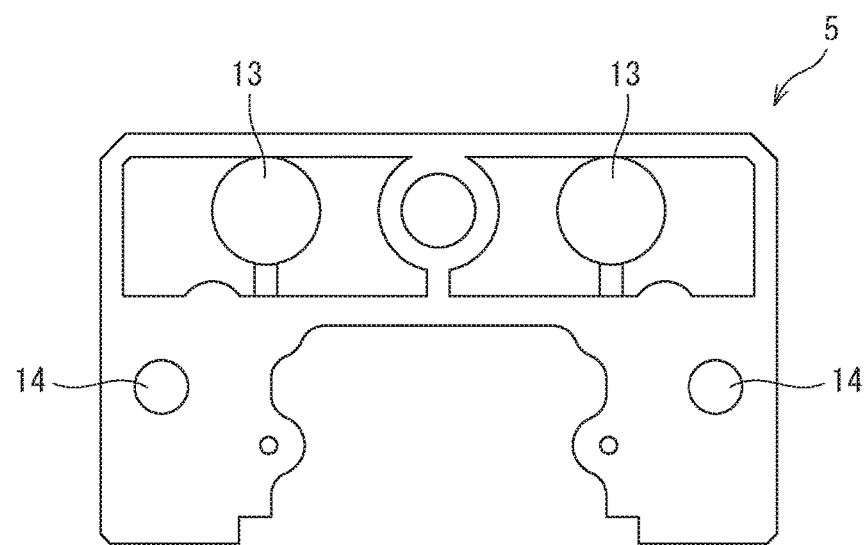

As illustrated in FIGS. 3A and 3B, the end cap 5 has substantially the same U-shaped cross section as that of the cross section of the slider main body 4. Two direction changeover paths 5a which connect the rolling paths to the return paths 4b are provided for each of the leg portions 4A and 4A of both sides on the front surface of the end cap 5 facing the slider main body 4.

Circular through-holes 13 and 14 are formed in the end cap 5 at respective positions facing the screw holes 11 and 12 of the slider main body 4. As long as the function is not impaired, the material of the end cap 5 may be made of a resin or made of a metal and is selected, as appropriate, according to an objective.

In this manner, due to the slider 3 including the slider main body 4 and the end cap 5, the slider 3 is capable of moving (rectilinear motion) on the guide rail 2 through the plurality of rolling elements which roll within the rolling paths. The plurality of rolling elements is capable of circulating in the rolling paths, the direction changeover paths 5a, and the return paths 4b.

[Side Seal]

Figure 4:
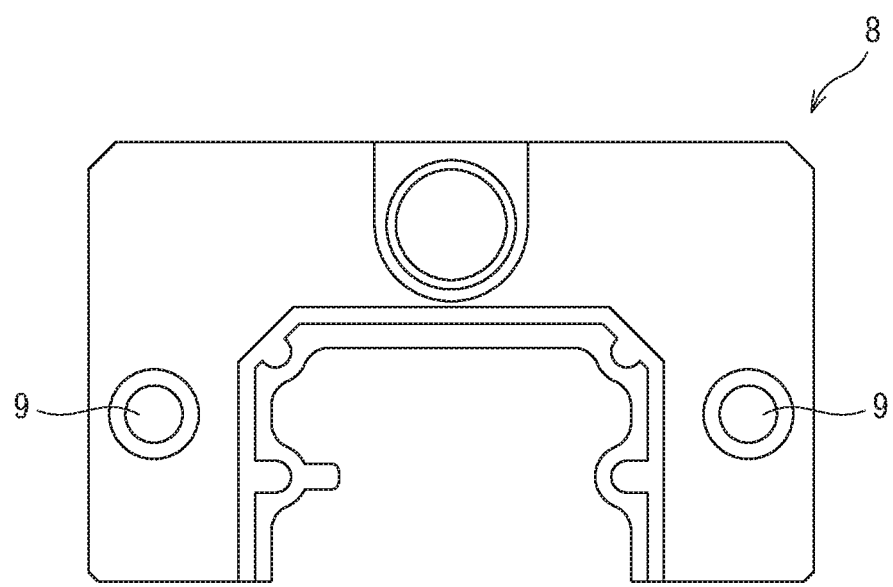
FIG. 4 is a front view illustrating a configuration of a side seal in the first embodiment of the linear motion guide device.

As illustrated in FIG. 4, the side seal 8 has a U-shaped cross section which straddles on both side surfaces and the top surface of the guide rail 2 in substantially the same manner as the sectional shapes of each of the slider main body 4 and the end cap 5. Due to the side seal 8 having such a shape, when the slider 3 is caused to perform rectilinear motion on the guide rail 2, it is possible to remove foreign matter such as dirt, dust, and waste which adheres to both side surfaces and the top surface of the guide rail 2. Circular through-holes 9 are formed in the side seal 8 at each of the positions facing the screw holes 12 of the slider main body 4. It is preferable that the side seal 8 is made of resin, for example.

<Oil Supply Device>

Next, a description will be given of the first embodiment of the oil supply device with reference to the drawings. It is preferable that the oil supply device of the present embodiment is provided in the linear motion guide device. Therefore, in the description of the present embodiment, as an example, a description will be given of an oil supply device 7 which is provided in the linear motion guide device 1.

Figure 5A:
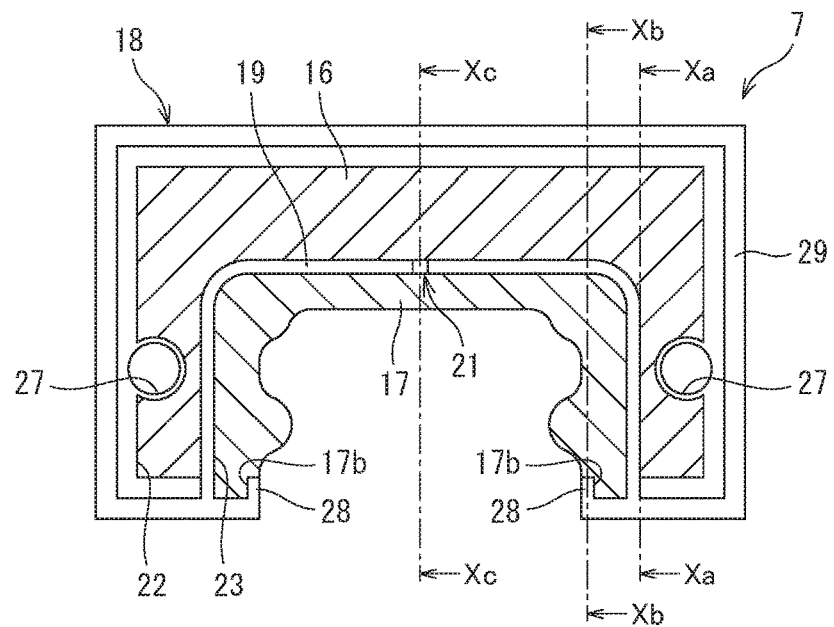
FIGS. 5A to 5C are diagrams illustrating a configuration in the first embodiment of an oil supply device, where
Figure 5B:
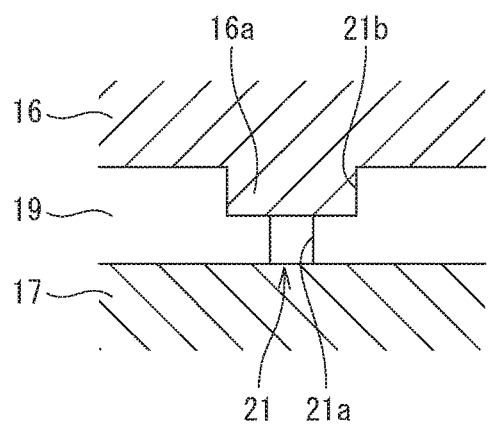
Figure 5C:
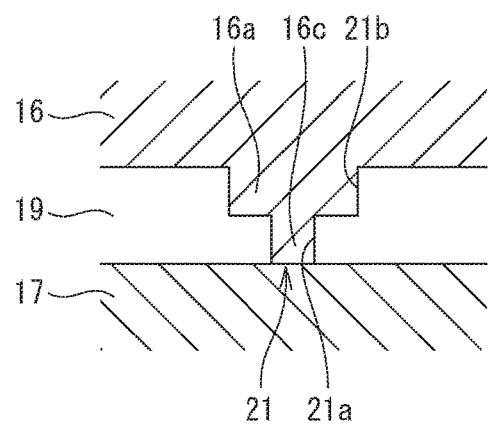

As illustrated in FIGS. 5A to 5C, the oil supply device 7 supplies oil, that is, supplies a lubricant to the guide rail 2 and includes a storing member 16 which stores the lubricant, an applicator 17 which applies the lubricant to the guide rail 2, and a lubricant container (which may be referred to as "the container" hereinafter) 18 which stores the storing member 16 and the applicator 17.

Figure 6A:
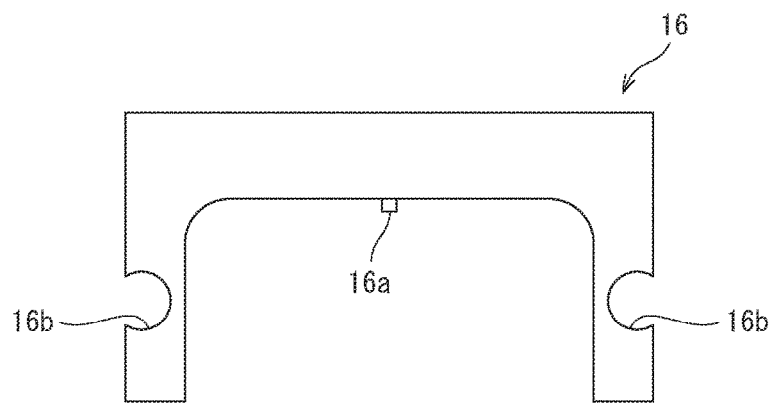
FIGS. 6A and 6B are diagrams illustrating a configuration of a storing member in the first embodiment of the oil supply device, where
Figure 6B:
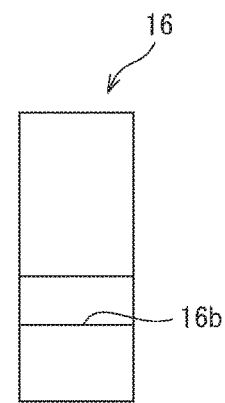

As illustrated in FIGS. 6A and 6B, the storing member 16 is a thick plate-shaped member with a substantial U shape and includes a porous formed body which is made of a resin and includes a large amount of the lubricant. A columnar protrusion 16a which is capable of fitting into a large diameter portion 21b of the communication hole 21 which is provided in a partition portion 19 (described later) of the container 18 is provided integrally on the inside surface of the leg portions of both sides of the storing member 16. Arc-shaped cutout portions 16b and 16b are formed in the leg portions of both sides of the storing member 16 at positions which face through-holes 27 (described later) of the container 18.

[Lubricant]

Here, it is preferable to use, as the lubricant, a lubricating oil (viscosity 10 to 200 mm2/δ) such as mineral oil, synthetic oil+synthetic hydrocarbon oil, mineral oil+synthetic hydrocarbon oil, and synthetic hydrocarbon oil, a grease (consistency 130 to 295) such as a lithium-based or a diurea-based urea bound substance.

[Applicator]

Figure 7A:
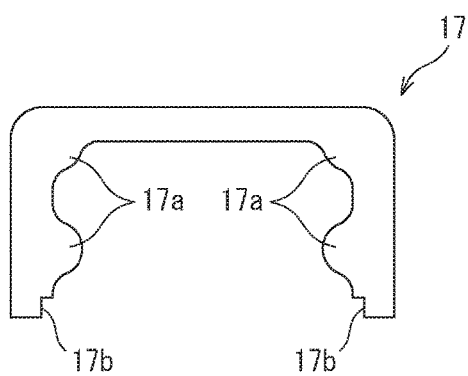
FIGS. 7A and 7B are diagrams illustrating a configuration of an applicator in the first embodiment of the oil supply device, where
Figure 7B:
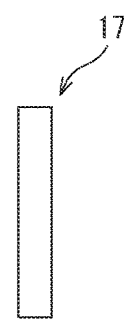

The applicator 17 contacts both side surfaces and the top surface of the guide rail 2 to apply the lubricant. As illustrated in FIGS. 7A and 7B, the applicator 17 is a thin plate-shaped member which is smaller than the storing member 16 and has a substantial U shape and includes a porous formed body which is made of a higher density resin than the storing member 16. The inside surface of the applicator 17 is shaped to conform to the shape of the guide rail 2 so as to be capable of contacting both side surfaces and the top surface of the guide rail 2. More specifically, lip portions 17a which are capable of contacting the rolling surfaces 2a of both side surfaces of the guide rail 2 are provided on the inside surface of the applicator 17. Rectangular cutout portions 17b are formed in the inside surfaces of the distal ends of the leg portions of both sides of the applicator 17.

[Porous Formed Body]

Here, examples of the porous formed bodies which are used in the storing member 16 and the applicator 17 include a felt, a resin, and a thermoplastic elastomer.

Examples of the material of the felt include polyα-olefin-based fibers such as polypropylene, polyethylene, polyethylene terephthalate, polybutylene, and polymethyl pentene. Other examples include aramid fibers such as polyaramide, and fluorine fibers such as PTFE.

Examples of the resin material include polyα-olefin-based resins such as polypropylene, polyethylene, polyethylene terephthalate, polybutylene, and polymethyl pentene, EVA resins, and EVOH resins.

Examples of the thermoplastic elastomer include polyaramide-based elastomers such as polyamide, and elastomers such as polyethylene and polypropylene.

It is preferable that the proportion (mass %) of the storing member 16 or the applicator 17 to the lubricant is 10 to 80:90 to 20. When the proportion of the storing member 16 or the applicator 17 is less than 10 mass %, the strength is insufficient, and when the proportion exceeds 80 mass %, the supply of the lubricant is insufficient since the lubricant content is little. The combinations of lubricants and materials of the storing member 16 and the applicator 17 are not limited.

[Container]

Figure 8A:
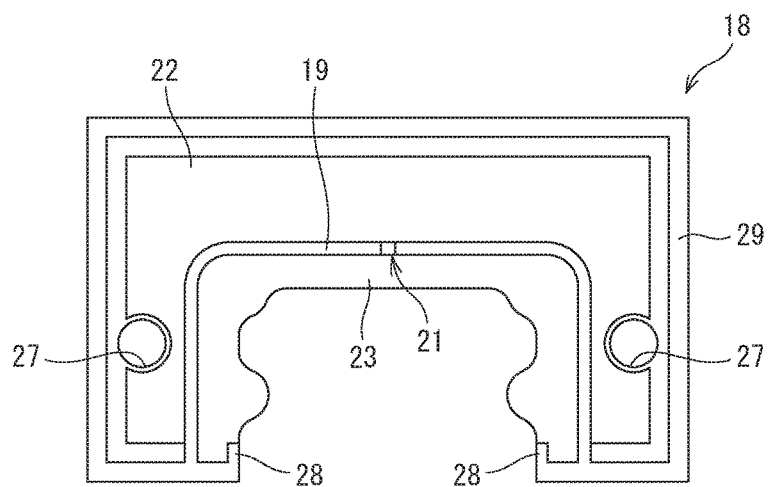
FIGS. 8A to 8C are diagrams illustrating a configuration of a lubricant container in the first embodiment of the oil supply device, where
Figure 8B:
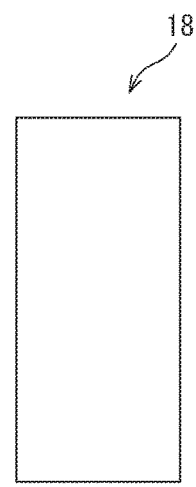
Figure 8C:
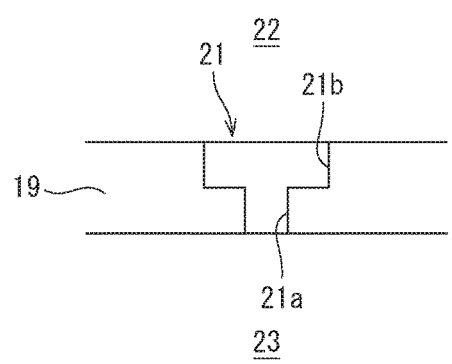

As illustrated in FIGS. 8A to 8C, the container 18 is a thick plate member which is made of resin and has a substantially U-shaped sectional shape in substantially the same manner as the end cap 5. As illustrated in FIG. 8A, a storing member accommodation portion 22 which accommodates the storing member 16 and an applicator accommodation portion 23 which accommodates the applicator 17 are provided via the partition portion 19 on the rear surface (the surface of the outside of the slider 3 in the longitudinal direction) of the container 18. The circular through-holes 27 are formed in the container 18 at positions facing the screw holes 12 of the slider main body 4.

[Storing Member Accommodation Portion]

As illustrated in FIG. 8A, the storing member accommodation portion 22 includes a recessed portion with a deep bottom (the dimension in a direction parallel to the movement direction is long) which is substantially U-shaped to conform to the shape of the outer circumferential surface side of the container 18, and it is possible to fit the storing member 16 in the inner portion of the storing member accommodation portion 22 without gaps. Since the bottom of the storing member accommodation portion 22 is deeper than the applicator accommodation portion 23 and is provided in the container 18 so as to surround the applicator accommodation portion 23, the storing member accommodation portion 22 has a larger capacity than the applicator accommodation portion 23.

[Applicator Accommodation Portion]

As illustrated in FIG. 8A, the applicator accommodation portion 23 includes a recessed portion with a shallow bottom (the dimension in a direction parallel to the movement direction is short) which is substantially U-shaped to conform to the shape of the inner circumferential surface side of the container 18, and it is possible to fit the applicator 17 in the inner portion of the applicator accommodation portion 23 without gaps. The portion of the applicator accommodation portion 23 facing the guide rail 2 is open, and the applicator 17 is capable of contacting the guide rail 2 when accommodating the applicator 17.

[Partition Portion]

As illustrated in FIG. 8A, the storing member accommodation portion 22 is formed on the outside of the applicator accommodation portion 23 to conform to the outer shape of the applicator accommodation portion 23. The partition portion 19 which partitions the applicator accommodation portion 23 and the storing member accommodation portion 22 is provided in the container 18 as a wall which forms the boundary between the storing member accommodation portion 22 and the applicator accommodation portion 23. The partition portion 19 has a U shape as viewed from the rear surface side of the container 18. The partition portion 19 extends to the bottom ends of the leg portions of both sides of the applicator accommodation portion 23, further extends to the inside surface, and forms L-shaped wall portions 28.

As illustrated in FIG. 8A, a circular communication hole 21 is formed in the partition portion 19 at a position facing the top surface of the guide rail 2. The communication hole 21 communicates the storing member accommodation portion 22 with the applicator accommodation portion 23 in order to guide the lubricant which is stored in the storing member 16 to the applicator 17.

As illustrated in FIG. 8C, the communication hole 21 includes a small diameter portion 21a which is provided on the applicator accommodation portion 23 side and the large diameter portion 21b which is provided on the storing member accommodation portion 22 side, is coaxial with the small diameter portion 21a, and has a large diameter. The sectional shape of the communication hole 21 is not limited to being circular and may be rectangular or the like.

Figure 9A:
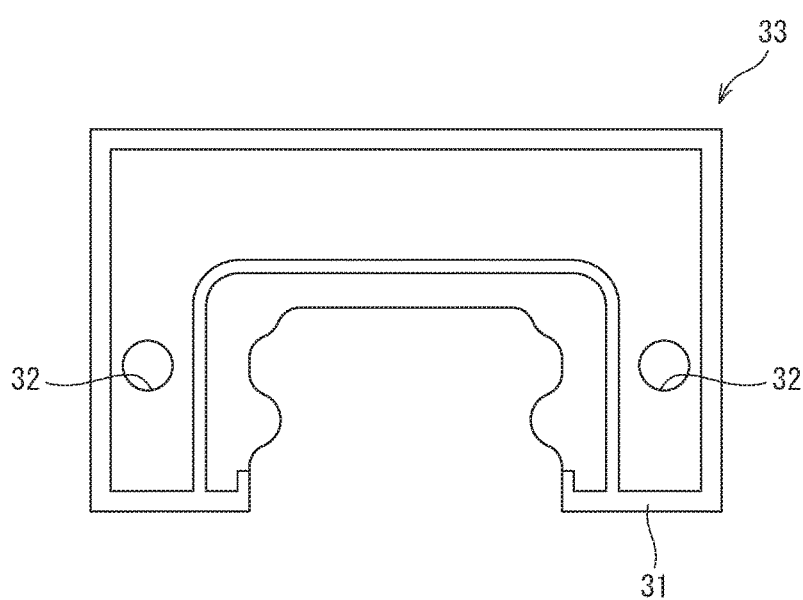
FIGS. 9A and 9B are diagrams illustrating a configuration of a cap in the first embodiment of the oil supply device, where
Figure 9B:
Figure 10A:
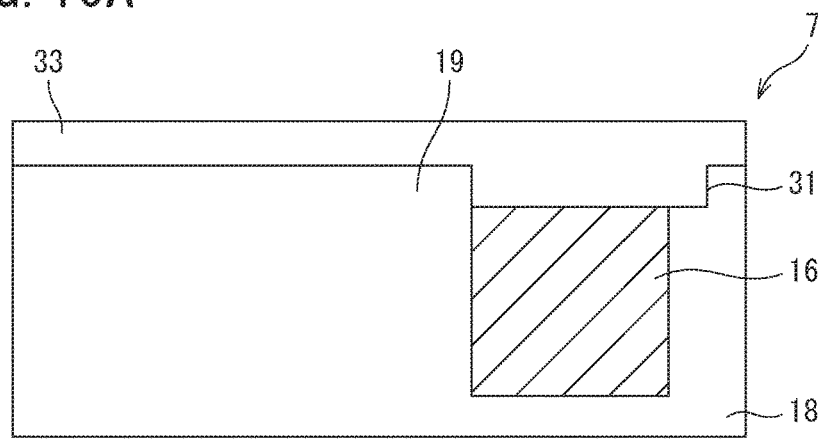
FIG. 10A is a sectional diagram taken along an Xa-Xa line of FIG. 5A.
Figure 10B:
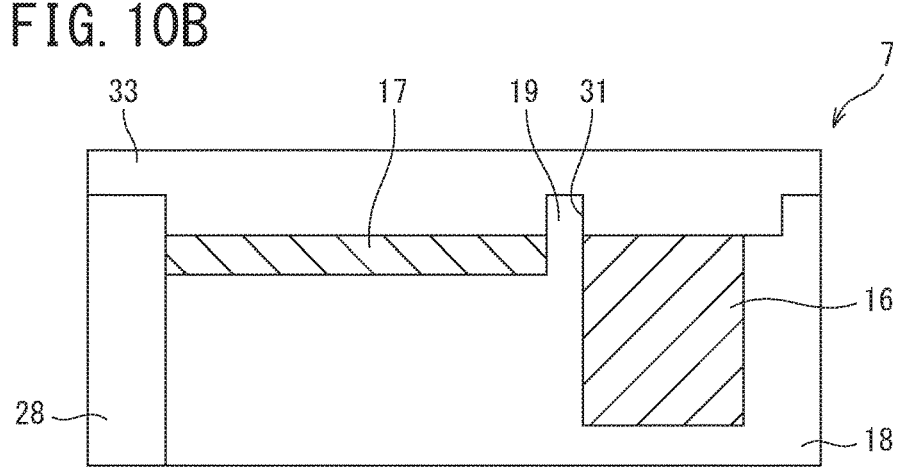
FIG. 10B is a sectional diagram taken along an Xb-Xb line of FIG. 5A.
Figure 10C:
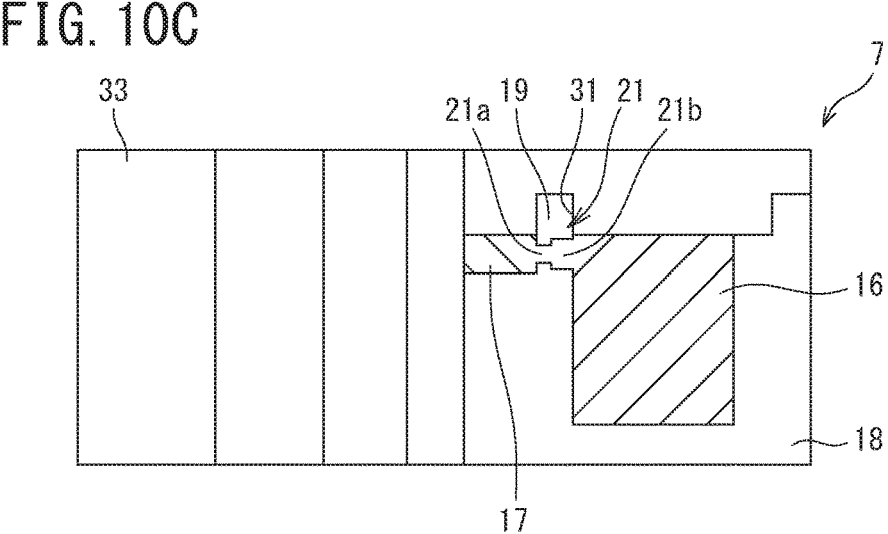
FIG. 10C is a sectional diagram taken along an Xc-Xc line of FIG. 5A (all in a state in which the cap is attached)

A cap 33 which is illustrated in FIGS. 9A and 9B is attached to the container 18 from the rear surface side. The cap 33 is made of the same resin as the container 18 and is a substantially U-shaped plate-shaped member. A groove portion 31 into which the partition portion 19 and an outer wall 29 of the container 18 fit is formed in the cap 33. Circular through-holes 32 are formed in the cap 33 at positions facing the through-holes 27 of the container 18.

[Assembly of Oil Supply Device]

Next, a description will be given of the procedure of the assembly of the oil supply device 7 with reference to FIGS. 5A to 5C.

First, as illustrated in FIG. 5A, the applicator 17 is accommodated in the applicator accommodation portion 23 of the container 18. At this time, the cutout portions 17b of the applicator 17 and the L-shaped wall portions 28 of the container 18 are fitted together. Accordingly, the L-shaped wall portions 28 are capable of supporting the applicator 17 while positioning the applicator 17 in the up-down direction of the slider main body 4.

Next, as illustrated in FIG. 5A, the storing member 16 is accommodated in the storing member accommodation portion 22 of the container 18. At this time, as illustrated in FIG. 5B, the columnar protrusion 16a of the storing member 16 is caused to fit into the large diameter portion 21b of the communication hole 21 which is provided in the partition portion 19. Accordingly, the communication hole 21 is capable of supporting the storing member 16 while positioning the storing member 16.

Next, the groove portion 31 of the cap 33 is fitted to the partition portion 19 and the outer wall 29 to attach the cap 33 to the container 18. Accordingly, the storing member accommodation portion 22 is sealed and the applicator 17 is sandwiched between the bottom surface of the applicator accommodation portion 23 and the cap 33 and is fixed. The assembly of the oil supply device 7 is completed in this manner. An adhesive may be used, as necessary, for the attachment of the cap 33 to the container 18.

[Attachment of Oil Supply Device]

Next, a description will be given of the procedure of attaching the oil supply device 7 to the slider main body 4 with reference to FIGS. 5A to 5C, 10A to 10C, and 11A to 11F.

First, as illustrated in FIGS. 11A and 11B, the end caps 5 are disposed on both end portions of the slider main body 4 in the longitudinal direction with the surfaces (the front surfaces) in which the direction changeover paths 5a are formed facing the slider main body 4. Screws 24 are passed through the through-holes 13 of the end caps 5 and fixed to the screw holes 11 of the slider main body 4 (the through-holes 13 and the screw holes 11 are not illustrated in FIGS. 11A to 11F). Accordingly, the attachment of the end caps 5 to the slider main body 4 is completed.

Next, as illustrated in FIGS. 11C and 11D, the oil supply devices 7 are disposed from the outside in the longitudinal direction of the slider main body 4 such that the containers 18 of the oil supply devices 7 are adjacent to each of the end caps 5.

Next, as illustrated in FIGS. 11E and 11F, the side seals 8 are disposed from the outside in the longitudinal direction of the slider main body 4 with respect to each of the oil supply devices 7. Screws 26 are passed through the through-holes 9 of the side seals 8, the through-holes 32 of the caps 33 of the containers 18, the through-holes 27 of the containers 18, and the through-holes 14 of the end caps 5 in this order and are fixed to the screw holes 12 of the slider main body 4 (the through-holes 32 and 27 and the screw holes 12 are not illustrated in FIGS. 11A to 11F). Accordingly, the attachment of the end caps 5, the oil supply devices 7, and the side seals 8 to the slider main body 4 is completed.

In this manner, it is possible to easily attach the oil supply devices 7 to the linear motion guide device 1.

[Supply of Lubricant]

In the linear motion guide device 1 which is provided with the oil supply devices 7, the lubricant which is stored in the storing member 16 inside the storing member accommodation portion 22 is guided from the communication hole 21 which is provided in the partition portion 19 to the applicator accommodation portion 23 and is supplied to the applicator 17 inside the applicator accommodation portion 23. Accordingly, when the slider 3 moves (rectilinear motion) on the guide rail 2, the applicator 17 is capable of contacting both the side surfaces and the top surface of the guide rail 2 and applying the lubricant and the oil supply is achieved.

As described above, since the storing member 16 includes a low-density porous formed body in comparison to the applicator 17, the per-unit-volume storage amount of the lubricant is great, and since the volume is greater, it is possible to store a great amount of the lubricant. Since the applicator 17 is a thin plate-shaped member in comparison to the storing member 16 and the contact area with the guide rail 2 is also small, it is possible to apply an appropriate amount of the lubricant to the guide rail 2 while preventing the lubricant from flowing out to the guide rail 2. Therefore, it is possible to suppress large consumption of the lubricant in a short period and to perform the oil supply in a stable manner for a long period.

The storing member 16 and the applicator 17 are arranged in the container 18 in the directions which are perpendicular to the longitudinal direction of the slider 3 (the width direction and the up-down direction) and the communication hole 21 that is formed in the partition portion 19 between the storing member 16 and the applicator 17 penetrates in the up-down direction. Therefore, the lubricant inside the storing member accommodation portion 22 passes the communication hole 21 and spreads inside the applicator 17 from above to below along the inside in accordance with gravity. Therefore, as compared with an oil supply device of the related art, it is possible to favorably cause the lubricant to reach the portions of the applicators 17 that contact with the guide rail 2. As a result, it is possible to sufficiently apply the lubricant to the guide rail 2. In particular, when a plurality of the communication holes 21 which is formed in the partition portion 19 is formed in the up-down direction, the supplying of the lubricating oil from the storing member 16 to the applicator 17 is promoted and the lubricant spreads in the applicator 17 toward each of the rolling surfaces 2a of the guide rail 2. Accordingly, it is possible to more reliably apply the lubricant to each of the rolling surfaces 2a of the guide rail 2.

It is possible to smoothly and stably guide the lubricant inside the storing member 16 to the applicator 17 by providing the small diameter portion 21a in the communication hole 21. Specifically, since the force working between the small diameter portion 21a of the communication hole 21 and the molecules of the lubricant (the adhesion force, the degree of ease of wetting) is greater than the capillary phenomenon, that is, the intermolecular force (the cohesive force) working between the molecules of the lubricant, it is possible to smoothly and stably guide the lubricant inside the communication hole 21 to the applicator 17 due to the lubricant being pulled toward the wall surfaces of the small diameter portion 21a and entering the small diameter portion 21a.

Accordingly, it is possible to provide an oil supply device which is capable of sufficiently applying the lubricant to the guide rail and a linear motion guide device which is provided with the oil supply device.

In the present embodiment, as illustrated in FIG. 5B, the applicator 17 and the storing member 16 are not in contact with each other inside the communication hole 21 of the container 18. However, the modification example is not limited thereto, and as illustrated in FIG. 5C, a configuration may be adopted in which a small protrusion 16c which is capable of fitting into the small diameter portion 21a of the communication hole 21 and is columnar is further provided on the tip of the columnar protrusion 16a of the storing member 16, and the small protrusion 16c contacts the applicator 17. Accordingly, it is possible to smoothly and stably guide the lubricant inside the storing member 16 to the applicator 17. It is possible to achieve a similar effect even when a configuration is adopted in which the columnar protrusion 16a of the storing member 16 is designed to be larger than the large diameter portion 21b of the communication hole 21 and the protrusion 16a deforms, fills the small diameter portion 21a, and contacts the applicator 17 when the protrusion 16a is inserted into the communication hole 21.

It is possible to change the supply amount of the lubricant from the storing member accommodation portion 22 (the storing member 16) to the applicator accommodation portion 23 (the applicator 17) in the container 18 by changing the size of the small diameter portion 21a of the communication hole 21, using porous formed bodies of different densities in the applicator 17, changing the lubricant, or by performing at least two of these at the same time. Here, "changing the lubricant" means using a lubricating oil with a different viscosity in a case in which a lubricating oil is used as the lubricant and using a grease with a different consistency in a case in which a grease is used as the lubricant.

Since the oil supply device 7 of the present embodiment includes a simple configuration of four parts of the storing member 16, the applicator 17, the container 18, and the cap 33, the oil supply device 7 also has the characteristic of having few parts and a low cost.

In the oil supply device 7 of the present embodiment, in addition to the aspect of the communication hole 21 which is described above, the communication hole 21 may be formed in another location of the partition portion 19.

Second Embodiment

Since an oil supply device of the present embodiment does not differ from that of the first embodiment except in that a pressing member (described later) is provided on the inside of the oil supply device, the same reference numerals will be applied to members that are duplicate or equivalent to those of the first embodiment and the description thereof will be omitted. With regard to the second embodiment of the linear motion guide device which is provided with the oil supply device, since the configuration is the same as the linear motion guide device of the first embodiment except for the oil supply device, the description will be omitted.

Next, as illustrated in FIGS. 12A and 12B, the oil supply device 7 of the present embodiment is further provided with a pressing member 37 on the storing member accommodation portion 22 of the container 18.

The pressing member 37 is a rod-shaped member made of a metal having a circular cross section, for example. The pressing member 37 has a W-shape which makes internal contact with a top surface 22a and side surfaces 22b and 22b of the storing member accommodation portion 22 of the container 18, and a portion which curves downward at the center portion is installed so as to bias an edge portion of the communication hole 21 which is formed in the partition portion 19. As long as the pressing member 37 is installed in the storing member accommodation portion 22 so as to push the storing member 16 into the communication hole 21 in order to more reliably bring the storing member 16 and the applicator 17 into contact with each other, the shape and the installation mode need not be as described and are selected, as appropriate, according to the purpose. The cross section of the pressing member 37 is not limited to being circular and may be rectangular or the like.

Examples of the specific material of the pressing member 37 include, for example, a hard steel wire, a piano wire, an oil tempered wire, a stainless steel wire, and a spring-steel steel material.

[Assembly of Oil Supply Device]

Next, a description will be given of the procedure of the assembly of the oil supply device 7 with reference to FIGS. 12A and 12B. Since "the attachment of the oil supply device" is the same as in the first embodiment, the description thereof will be omitted.

First, as illustrated in FIGS. 12A and 12B, the applicator 17 is accommodated in the applicator accommodation portion 3 of the container 18. At this time, the cutout portions 17b of the applicator 17 and the L-shaped wall portions 28 of the container 18 are fitted together. Accordingly, the L-shaped wall portions 28 are capable of supporting the applicator 17 while positioning the applicator 17 in the up-down direction of the slider main body 4.

Next, as illustrated in FIGS. 12A to 12C, the storing member 16 is accommodated in the storing member accommodation portion 22 of the container 18. At this time, the columnar protrusion 16a of the storing member 16 is caused to fit into the large diameter portion 21b of the communication hole 21 which is provided in the partition portion 19. Accordingly, the communication hole 21 is capable of supporting the storing member 16 while positioning the storing member 16.

Next, the pressing member 37 is placed on the storing member 16, and among the three curved portions of the pressing member 37, the curved portions of both sides are caused to contact the top surface 22a and the side surfaces 22b and 22b of the storing member accommodation portion 22, and the curved portion of the center portion is installed while using elasticity in the up-down direction so as to bias the edge portion of the communication hole 21.

Here, since the lubricant is expelled from the storing member 16 to the applicator 17, the lubricant inside the storing member 16 is reduced. Accordingly, the capillary phenomenon weakens, the supply amount of the lubricant to the applicator 17 is reduced, and the linear motion guide device is faultily lubricated.

Therefore, by installing the pressing member 37, the storing member 16 which is pressed into the communication hole 21 protrudes into the applicator accommodation portion 23 to deform the applicator 17 and reliably contact the applicator 17. This state is maintained by the biasing force of the curved portion of the center portion of the pressing member 37. In this manner, it is possible to increase the supply amount of the lubricant to the applicator through the capillary phenomenon due to the compressive force of the pressing member 37.

As a modification example, instead of the communication hole 21 including the small diameter portion 21a and the large diameter portion 21b, as illustrated in FIG. 12D, the communication hole 21 may be configured by a communication hole 21C which has a uniform width and the curved portion of the center portion of the pressing member 37 may be installed to bias the edge portion of the communication hole 21C.

Next, the groove portion 31 of the cap 33 is fitted to the partition portion 19 and the outer wall 29 to attach the cap 33 to the container 18. Accordingly, the storing member accommodation portion 22 is sealed and the applicator 17 is sandwiched between the bottom surface of the applicator accommodation portion 23 and the cap 33 and is fixed. At this time, since the storing member 16 fills the storing member accommodation portion 22 without gaps, the pressing member 37 is pushed by the cap 33 toward the bottom surface of the storing member accommodation portion 22. Accordingly, a force in the same direction is applied to the storing member 16 by the pressing member 37 which is pushed in, the storing member 16 deforms, and the lubricant seeps out from the storing member. Since the lubricant which seeps out travels along the pressing member 37 and gathers at the vicinity of the tip of the pressing member 37, it is possible to efficiently guide the lubricant inside the storing member accommodation portion 22 to the communication hole 21.

The assembly of the oil supply device 7 is completed in this manner. An adhesive may be used, as necessary, for the attachment of the cap 33 to the container 18.

According to the oil supply device 7 of the present embodiment, in addition to the effects of the first embodiment, since it is possible to efficiently guide the lubricant inside the storing member accommodation portion 22 to the communication hole 21 using the pressing member 37, it is possible to more smoothly and stably supply the lubricant to the applicator accommodation portion 23.

Hereinabove, a description is given of the embodiments of the oil supply device and the linear motion guide device; however, the oil supply device and the linear motion guide device of the present invention are not limited to these embodiments and various modifications are possible without departing from the gist of the present invention.

For example, in each of the embodiments, an example of the linear motion guide device and the oil supply device which is provided in the linear motion guide device is illustrated; however, the present invention is not limited thereto, and it is possible to apply the present invention to other motion guide devices, for example, a rolling bearing guide device which includes a curvilinear motion guide device.

In each of the present embodiments, an example is given of the communication hole 21 as a configuration which communicates the storing member accommodation portion 22 with the applicator accommodation portion 23 which are partitioned by the partition portion 19; however, a groove which communicates the storing member accommodation portion 22 with the applicator accommodation portion 23 may be provided instead.

The oil supply device of each of the embodiments is provided with each of end portions of the end caps 5 and 5, which are attached to both end portions of the slider main body 4 in the movement direction; however, the oil supply device is not limited thereto and may be configured to be provided with the end portion of only one of the end caps 5.

In each of the embodiments, the linear motion guide device which is provided with balls as the rolling elements is illustrated; however, the configuration is not limited thereto, and it is possible to configure a linear motion guide device which is provided with rollers as the rolling elements.

Hereinabove, a description is given of the present invention with reference to specific embodiments; however, the invention should not be construed to be limited by these descriptions. Various modification examples of the disclosed embodiments and other embodiments of the present invention are clear to a person skilled in the art by referring to the descriptions of the present invention. Therefore, the scope of the claims should be understood to encompass the modification examples or embodiments which are included in the scope and the gist of the invention.

REFERENCE SIGNS LIST 1 linear motion guide device
2 guide rail
3 slider
4 slider main body
5 end cap
7 oil supply device
8 side seal
16 storing member
17 applicator
18 container
19 partition portion
21 communication hole
22 storing member accommodation portion
23 applicator accommodation portion
33 cap
37 pressing member

The invention claimed is:
1. An oil supply device comprising:
a storing member which holds a lubricant;
an applicator for applying the lubricant to a guide rail; and
a container which accommodates the applicator and the storing member and is installed on an end portion in a longitudinal direction of a slider,
wherein in the container, a storing member accommodation portion which accommodates the storing member and an applicator accommodation portion which accommodates the applicator are provided to be arranged in an up-down direction and a communication hole for guiding the lubricant from the storing member accommodation portion to the applicator accommodation portion is formed in a partition portion which partitions the applicator accommodation portion and the storing member accommodation portion,
wherein the communication hole includes a small diameter portion which is positioned on the applicator accommodation portion side and a large diameter portion which is positioned on the storing member accommodation portion side and is larger than the small diameter portion, and
wherein the storing member is provided with a protrusion portion which is capable of fitting into the large diameter portion.

2. The oil supply device according to claim 1,
wherein the applicator includes a porous formed body, and
wherein the storing member includes a porous formed body having a greater per-unit-volume amount of holding the lubricant than that of the applicator.

3. The oil supply device according to claim 1,
wherein the storing member accommodation portion has a deeper bottom and a greater capacity than those of the applicator accommodation portion.

4. The oil supply device according to claim 1,
wherein in the applicator accommodation portion, a portion facing the guide rail is open and a support portion for supporting the applicator while positioning the applicator in the up-down direction is provided.

5. The oil supply device according to claim 1, further comprising:
a pressing member which presses the storing member which is accommodated in the storing member accommodation portion.

6. The oil supply device according to claim 1,
wherein the applicator and the storing member contact each other inside the communication hole or in a vicinity of the communication hole.

7. A linear motion guide device, comprising:
a guide rail;
a slider; and
rolling elements,
wherein the guide rail and the slider include respective rolling surfaces in positions facing each other, the rolling surfaces forming a rolling path of the rolling elements,
wherein the rolling surfaces extend in a longitudinal direction of the guide rail,
wherein the rolling elements are disposed in the rolling path,
wherein the slider straddles on the guide rail via the rolling elements to be capable of moving along the longitudinal direction and is provided with a slider main body and an end cap on at least one of both end surfaces of the slider main body in a movement direction,
wherein the oil supply device according to claim 1 is provided on at least one of both end surfaces of the slider in the movement direction.

* * * * *